United States Patent Office 2,800,560
Patented July 23, 1957

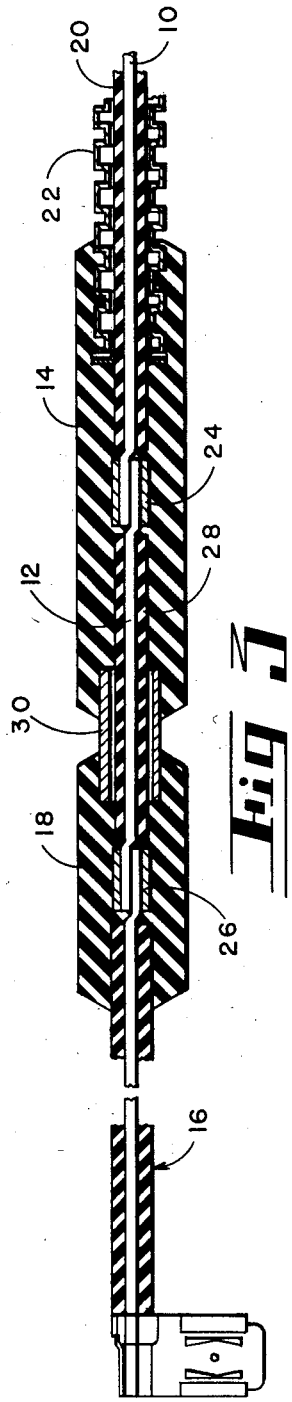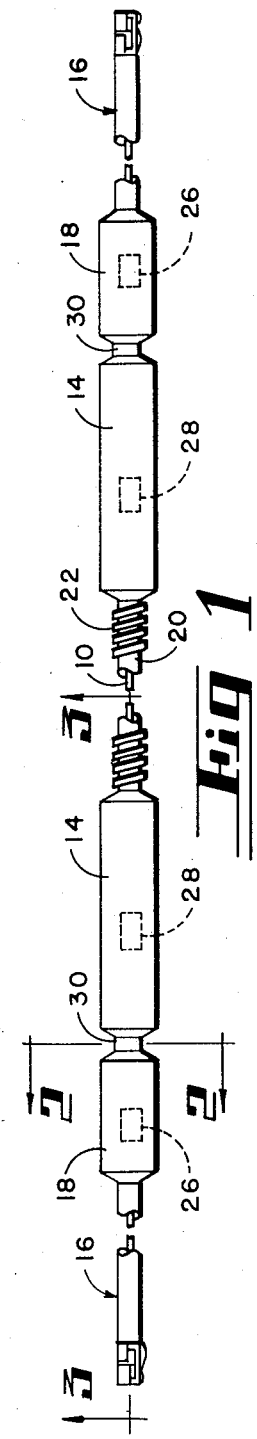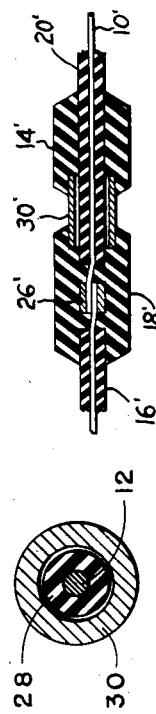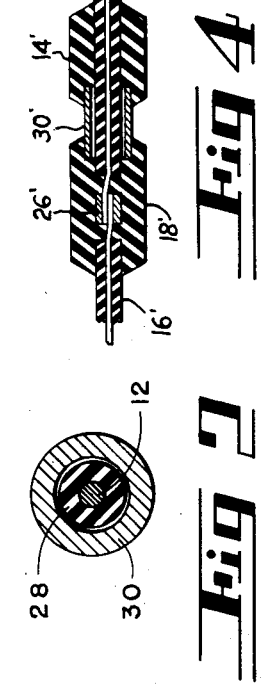
INVENTORS.
JEROME H. SCHROTTER
BY  DAN B. DUNCAN
ATTORNEYS ial No. 581,735

2,800,560

WATER-PROOF ELECTRICAL CONNECTION AND METHOD OF MAKING THE SAME

Jerome H. Schrotter, Wyandotte, Mich., and Dan B. Duncan, Cincinnati, Ohio; said Schrotter assignor to Riverside Manufacturing and Electrical Supply Company, Dearborn, Mich., a corporation of Michigan, and said Duncan assignor to Avco Manufacturing Corporation, Cincinnati, Ohio, a corporation of Delaware Application April 30, 1956, Serial No. 581,735

13 Claims. (Cl. 201—63)

The present invention relates to a defroster-heater and, more particularly, to a joint providing a moisture-proof and liquid-proof connection between a silicone rubber-insulated heater wire and a rubber-insulated lead wire and to a method of producing such a joint.

A complete disclosure of the type of defroster-heater with which this invention is particularly useful is shown in the presently pending application, Serial No. 471,432, filed on November 26, 1954, by Dan B. Duncan and William R. Mittendorf on a Flexible Electric Defroster-Heater for Refrigerator.

As disclosed in that application, a high resistance heater wire is insulated with a coating of heat-resisting insulation, such as silicone rubber. "Silicone rubber," as used in this specification, is meant to define a semi-inorganic rubber, such as organo-silicon-oxide polymer, whereas "rubber" is meant to define organic rubber, such as natural or synthetic rubber. While silicone rubber is capable of withstanding the elevated temperatures developed by the heater wire without detrimental deterioration or reduction of insulating characteristics, its tensile strength is rather low, and it is susceptible to abrasion and tearing. To protect this silicone rubber of the heaters, a spiral, flexible armor of high thermal conductivity is provided around it.

It will be understood that it is desirable, if not necessary, in many instances to connect a lead wire to each end of the heat-dissipating high resistance wire. For defroster-heater use, this connection must be protected by a durable, water-tight, flexible joint. Since that portion of the joint adjacent the heater wire must be capable of withstanding the high temperatures of the heater, it is preferably made of silicone rubber.

It is well known that silicone rubber will not bond to rubber. Thus, in the past it has been necessary to insulate the lead wire with silicone rubber to insure a bond between the insulations and the silicone joint material to provide a waterproof joint. In order to provide the lead wire with sufficient strength and to protect the silicone rubber insulation, flexible armor similar to that provided for the heater wire is provided around the insulation of this lead wire.

Silicone rubber insulation and protective armor sheathing for the lead wire are expensive. Further, water can become trapped between the armor and the insulation, which is highly objectionable. Any water entering the armor of the heater wire is dissipated when the heater is energized, whereas the lead wire generates virtually no heat, and the water will stagnate.

To overcome the objections of silicone-insulated lead wire, this invention provides a moisture-proof joint between a silicone-insulated heater wire and a rubber-insulated lead wire. The use of a rubber-insulated lead wire substantially reduces the cost of the heater assembly and gives sufficient tensile strength and abrasion resistance. Thus, this invention provides such a means of connecting silicone-insulated heater wire with rubber-insulated lead wire.

It is an object of this invention to provide a sealed joint for connecting a silicone-insulated wire with a rubber-insulated wire.

It is another object of this invention to provide a method of producing a water-proof joint between silicone rubber-insulated wire and rubber-insulated wire.

It is a further object of this invention to provide such a joint that is moisture-proof and has sufficient tensile strength and duability to withstand normal handling.

The novel features that we consider characteristic of our invention are set forth in the appended claims; the invention itself, however, both as to its organization and method of operation, together with additional objects and advantages thereof, will best be understood from the following description of a specific embodiment when read in conjunction with the accompanying drawing in which:

Figure 1 is a side view of the flexible electric heater assembly;

Figure 2 is an enlarged cross-sectional view taken on plane 2—2 of Figure 1 through the ferrule connecting the two joints;

Figure 3 is an enlarged longitudinal sectional view of an end of the heater assembly taken on plane 3—3 of Figure 1; and Figure 4 is an enlarged longitudinal sectional view of one end of the heater assembly, similar to Figure 3, but illustrating a modification thereof.

Referring to Figs. 1 and 2 of the drawing, the basic elements of the assembly comprise a high resistance wire 10, intermediate lead wires 12 attached in electrical conducting relationship to the ends of wire 10, and a flexible, water-tight silicone rubber joint 14 surrounding this connection. Further, terminal lead wires, generally designated at 16, are electrically connected to the other ends of intermediate lead wires 12 with a flexible, water-tight rubber joint 18 surrounding this second connection.

A more detailed understanding of the invention may be had by referring to Fig. 3, which is a longitudinal sectional view of the joint at one end of the heater wire. Since the joints at each end of the heater wire are identical, only one will be described. There is shown a high resistance electric heater wire 10, silicone rubber insulation 20 surrounding said heater wire and protective spiral flexible metal armor 22 surrounding insulation 20. As is known to those skilled in the art, silicone rubber has excellent heat resistance characteristics and will not deteriorate appreciably in continuous use at temperatures as high as 390° F.

An intermediate lead wire 12 is electrically connected to each end of heater wire 10 by connectors 24. Silicone rubber insulation 28 is provided over these intermediate lead wires 12. A ferrule 30 constructed of a material, such as aluminum, that is capable of being bonded to both silicone rubber and natural or synthetic rubber is placed over each intermediate lead wire intermediate its ends. A silicone rubber joint 14 is formed around each connector 24, as well as insulations 20 and 28, an end portion of a ferrule 30 and an end of armor 22. This sub-assembly is next placed in a suitable mold and subjected to a proper molding temperature for a specified period of time, such as 250° F. to 275° F., for ten minutes to set the silicone rubber to its permanent shape. Joints 14 will intimately bond to insulations 20 and 28, as well as to ferrules 30 and armor 22. The silicone rubber insulations 20 and 28 and joints 14 are uncured, or only partially cured, at this stage of the assembly. It should be noted that this sub-assembly contains only silicone rubber (in addition to metal parts) and the molding and curing peculiar to this type of material can be performed before the organic rubber is added to the assembly.

After the assembly has been molded it is subjected to a curing operation. As is well known to those versed in the art, this curing is desirable and necessary to stabilize the physical properties of the silicone and preclude the possibility of it reverting to its original state or breaking down chemically. This reversion may take place when the silicone is subjected to elevated temperatures in a confined space if the volatile matters in the silicone are not driven off by curing. This curing can be carried out at a temperature slightly below the operating temperature of the heater wire for a long period of time, or for a shorter period of time if carried on at a temperature in excess of the operating temperature. Thus, by way of example, the curing operation can be carried on at 300° F. for ten hours or at 480° F. for four hours. The operating temperature of the heaters in this embodiment is approximately 400° F., which is sustained for about fifteen minutes in each operating cycle.

It will be appreciated by those versed in the art that if natural or synthetic rubber were subjected to these high curing temperatures for extended periods of time the physical properties would be destroyed, rendering it unsuitable for electrical insulating purposes. The procedure previously described enables the molding and curing of all of the silicone rubber contained in the assembly at one time and in one operation and before any rubber is introduced.

Upon completion of this curing operation, a terminal lead wire 16 insulated with rubber insulation is secured to the other end of each intermediate lead wire 12 by connectors 26. A rubber joint 18 is then molded around each connection wherein the joint intimately bonds with the rubber insulation of terminal lead 16 adjacent the connection, connector 26 and the opposite end of ferrule 30. This molding is accomplished by methods well known to the rubber molding industry, by placing the components to be molded in a suitable mold and subjecting them to an elevated temperature, such as approximately 300° F., for ten minutes.

It will be noted that this construction provides a completely moisture-proof connection between terminal lead wire 16 and heater wire 10, since the rubber joint 18 is intimately bonded with the insulation of terminal lead wire 16 and the adjacent end of ferrule 30; and the silicone rubber joint 14 is intimately bonded to the other end of ferrule 30, insulation 28 of intermediate lead 12 and insulation 20 of heater wire 10. Further, the rubber joint 18 is sufficiently remote from the resistance heater 10 that its physical properties will not be affected by the operation of the heater.

Referring to Figure 4, there is shown a modification or alternate construction of the present invention. Essentially this modification eliminates the silicone rubber insulated intermediate lead wire. As stated previously, the silicone rubber insulated intermediate lead wire is provided to isolate the silicone rubber insulated electrical resistance heater wire from the rubber insulated lead wire. This is necessary when the heater wire is operating at high temperature. If the heater wire is operated at lower temperatures, such as will not have deleterious effects upon the rubber insulated lead wire, this intermediate lead wire may be eliminated and the rubber covered lead wire can be connected directly to the heater wire, as is shown in Figure 4.

Referring to Figure 4, there is shown an electrical resistance heater wire 10' and silicone rubber insulation 20' surrounding said heater wire. A ferrule 30' is provided over the silicone rubber insulation 20' near a terminal end of the heater wire. A silicone rubber joint 14' is formed around the silicone rubber insulation 20' of heater wire 10' remote from its terminal end and an end portion of ferrule 30'. This sub-assembly is next placed into a suitable mold and molded, after which it is cured as previously described for the embodiment shown in Figure 3. Upon completion of this curing operation, a terminal lead wire 16', having rubber insulation, is secured to the end of the heater wire 10' by connector 26'.

A rubber joint 18' is then molded around this connection. The joint intimately bonds with the rubber insulation of terminal lead wire 16' adjacent the connection, connector 26' and the opposite end of ferrule 30'. This molding is accomplished in the same manner as that described for the embodiment shown in Figure 3. The embodiment of Figure 4, like the one utilizing the intermediate lead wire shown in Figure 3, provides a completely moisture-proof connection between the terminal leal wire 16' and the heater wire 10', since the rubber joint 18' is intimately bonded with the insulation of the terminal lead wire 16' and the adjacent end of ferrule 30'; the silicone rubber joint 14' is intimately bonded to the other end of ferrule 30' and insulation 20' of heater wire 10'.

In this embodiment, as in the previous one, the rubber joint and the rubber insulation of lead wire 16' are not subjected to the prolonged elevated temperature required for curing the silicone joint, and satisfactory operating conditions will be obtained when the heater wire is operated at temperatures below those which would adversely affect the rubber insulation of lead wire 16'.

The various features and advantages of the construction and method disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention.

We claim:

1. A flexible electric heater comprising a piece of high resistance heater wire, silicone rubber insulation surrounding said resistance wire with the ends of said wire exposed, interlocking flexible metallic armor spaced from and surrounding said insulation with the ends of said insulation exposed, a pair of intermediate lead wires, silicone rubber insulation surrounding said intermediate lead wires with the ends of said wires exposed, an electrical connector joining each exposed end of said heater wire to an exposed end of one of said intermediate lead wires, a metal ferrule shorter in length than the length of insulation of said intermediate lead wire and surrounding the insulation intermediate its ends, a molded silicone rubber joint surrounding each of said connectors and the adjacent exposed ends of said silicone insulations as well as the adjacent exposed end of said armor and a portion of said ferrule, said silicone rubber joint being intimately bonded to said insulations and said ferrule, a pair of terminal lead wires, rubber insulation surrounding said terminal lead wires with the ends of the wire exposed, a second electrical connector joining the other exposed end of each of said intermediate lead wires to the exposed end of one of said terminal lead wires, a molded rubber joint surrounding each of said second connectors and the adjacent rubber and silicone insulations as well as the adjacent exposed portion of said ferrule, said rubber joint being intimately bonded to said rubber insulation and said ferrule.

2. An electric heater comprising a piece of high resistance heater wire, silicone rubber insulation surrounding said resistance wire with the ends of said wire exposed, a pair of intermediate lead wires, silicone rubber insulation surrounding said intermediate lead wires with the ends of said wires exposed, an electrical connector joining each exposed end of said heater wire to an exposed end of one of said intermediate lead wires, a ferrule shorter in length than the length of insulation of said intermediate lead wire and surrounding the insulation intermediate its ends, a molded silicone rubber joint surrounding each of said connectors and the adjacent exposed ends of said insulations as well as a portion of said ferrule, said silicone rubber joint being intimately bonded to said insulation and said ferrule, a pair of terminal lead wires, rubber insulation surrounding said terminal lead wires with the ends of the wire exposed, a second electrical connector joining the other exposed end of each of said intermediate lead wires to the exposed end of one of said terminal lead wires, a molded rubber joint surrounding each of said second connectors and the adjacent rubber and silicone insulations as well as the adjacent exposed portion of said ferrule, said rubber joint being intimately bonded to said rubber insulation and said ferrule.

3. A flexible heater comprising a silicone rubber-insulated high resistance heater wire, interlocking flexible metal armor surrounding said insulated heater wire with the ends of the insulation exposed, silicone rubber-insulated intermediate lead wires electrically connected to the ends of said heater wire, a metal ferrule surrounding each of said insulated intermediate lead wires for a portion of its length, a silicone rubber joint surrounding each of the connections and the adjacent exposed ends of said silicone rubber insulations and a portion of an adjacent ferrule, said silicone rubber joint being intimately bonded to the insulations and said ferrule, a rubber-insulated terminal lead wire electrically connected to the other end of each intermediate lead wire, molded rubber joints surrounding the last-named connections and the adjacent ends of the rubber and silicone insulations, as well as the adjacent portion of said ferrules, said rubber joints being intimately bonded to said rubber insulations and said ferrules.

4. An electric heater comprising a silicone rubber-insulated high resistance heater wire, silicone rubber-insulated intermediate lead wires electrically connected to the ends of said heater wire, a ferrule surrounding each of said insulated intermediate lead wires for a portion of its length, a silicone rubber joint surrounding each of the connections and the adjacent exposed ends of said silicone rubber insulation and a portion of an adjacent ferrule, said silicone rubber joints being intimately bonded to the insulations and said ferrule, a rubber-insulated terminal lead wire electrically connected to the other end of each intermediate lead wire, molded rubber joints surrounding the last-named connections and the adjacent ends of the rubber and silicone insulations, as well as the adjacent portion of said ferrules, said rubber joints being intimately bonded to the rubber insulations and said ferrules.

5. A joint comprising a silicone rubber-insulated wire, a ferrule near one end of said silicone rubber-insulated wire, a rubber-insulated wire electrically connected to said silicone rubber-insulated wire at the end adjacent the ferrule, a molded silicone rubber joint surrounding the silicone rubber insulation and one end of said ferrule, said silicone rubber joint being intimately bonded to said silicone insulation and said ferrule, a rubber joint surrounding the adjacent end of said rubber insulation and the other end of said ferrule, said joint being intimately bonded to said rubber insulation and said ferrule.

6. A joint comprising a high resistance heater wire, silicone rubber insulation surrounding said heater wire, a ferrule near one end of said heater wire, a rubber-insulated wire electrically connected to said heater wire at its end adjacent the ferrule, a molded silicone rubber joint surrounding the silicone rubber insulation and one end of said ferrule, said silicone rubber joint being intimately bonded to said silicone insulation and said ferrule, a rubber joint surrounding the adjacent end of said rubber insulation and the other end of said ferrule, said joint being intimately bonded to said rubber insulation and said ferrule.

7. The method of forming a water-proof joint between a silicone rubber-insulated electrical resistance heater wire having a metallic ferrule surrounding the insulation and positioned near a terminal end of the insulation and a rubber-insulated lead wire comprising first forming a silicone rubber joint surrounding the insulation of said heater wire and a portion of the ferrule, molding the joint in a mold at a temperature of approximately 250° F. for ten minutes, whereby the joint is intimately bonded to the silicone rubber insulation and the ferrule, curing the silicone rubber insulation and the joint at a temperature of approximately 300° F. for ten hours, thereafter electrically connecting the lead wire to the heater wire at its end adjacent the ferrule, forming a rubber joint surrounding a portion of the rubber insulation of the lead wire adjacent its electrical connection with the heater wire and the other end of the ferrule and molding this joint in a mold at a temperature of approximately 300° F. for ten minutes, whereby the rubber joint will intimately bond to the rubber insulation of the lead wire and the ferrule.

8. The method of forming a water-proof joint between a silicone rubber-insulated electrical resistance heater wire having a metallic ferrule positioned near a terminal end of the insulation and a rubber-insulated lead wire comprising first forming a silicone rubber joint surrounding the insulation of said heater wire and a portion of the ferrule, molding the joint in a suitable mold at a temperature of approximately 250° F. for ten minutes, whereby the joint is intimately bonded to the silicone rubber insulation and the ferrule, curing the silicone rubber insulation and the joint at a temperature of approximately 480° F. for four hours, thereafter electrically connecting the lead wire to the heater wire at its end adjacent the ferrule, forming a rubber joint surrounding a portion of the rubber insulation of the lead wire adjacent its electrical connection with the heater wire and the other end of the ferrule and molding this joint in a suitable mold at a temperature of approximately 300° F. for ten minutes, whereby the joint will intimately bond to the rubber insulation of the lead wire and the ferrule.

9. The method of forming a water-proof joint between a silicone rubber-insulated wire having a ferrule surrounding the insulation and positioned near a terminal end of the insulation and a rubber-insulated wire comprising first forming a silicone rubber joint surrounding the silicone insulation and a portion of the ferrule, molding the joint in a suitable mold at a temperature of approximately 250° F. for ten minutes, whereby the joint will be intimately bonded to the silicone rubber insulation and the ferrule, curing the silicone rubber at a temperature of approximately 300° F. for ten hours, thereafter electrically connecting the rubber-insulated wire to the silicone rubber-insulated wire at its end adjacent the ferrule, forming a rubber joint surrounding a portion of the rubber insulation and the other end of the ferrule and molding this joint in a suitable mold at a temperature of approximately 300° F. for ten minutes, whereby the joint will intimately bond to the rubber insulation and the ferrule.

10. The method of forming a water-proof joint between a silicone rubber-insulated wire having a ferrule positioned near a terminal end of the insulation and a rubber-insulated wire comprising first forming a silicone rubber joint surrounding the silicone insulation and a portion of the ferrule, molding the joint in a suitable mold at a temperature of approximately 250° F. for ten minutes, whereby the joint will be intimately bonded to the silicone rubber insulation and the ferrule, curing the silicone rubber at a temperature of approximately 480° F. for four hours, thereafter electrically connecting the rubber-insulated wire to the silicone rubber-insulated wire at its end adjacent the ferrule, forming a rubber joint surrounding a portion of the rubber insulation and the other end of the ferrule and molding this joint in a suitable mold at a temperature of approximately 300° F. for ten minutes, whereby the joint will intimately bond to the rubber insulation and the ferrule.

11. The method of forming a water-proof joint between a silicone rubber-insulated wire having a ferrule near the terminal end of the wire and a rubber-insulated wire, comprising forming, molding and curing silicone rubber joint surrounding and bonding to the silicone rubber insulation and one end of the ferrule and thereafter electrically connecting the rubber-insulated wire to the end of the silicone rubber-insulated wire at its end adjacent the ferrule, forming and molding a rubber joint surrounding and bonding to the rubber insulation and the ferrule.

12. A method of forming a water-proof joint between a silicone rubber-insulated electrical resistance heater wire having a ferrule surrounding the insulation and positioned near one end of the resistance wire and a rubber-insulated lead wire comprising first forming, molding and curing a silicone rubber joint surrounding and bonding to the silicone rubber insulation of the heater wire and one end of the ferrule and thereafter forming and molding a rubber joint surrounding and bonding to the rubber insulation of the lead wire and the ferrule.

13. The method of forming a water-proof joint between a silicone rubber-insulated electrical resistance heater wire and a rubber-insulated lead wire wherein a silicone rubber-insulated intermediate lead wire is electrically connected between said heater wire and said lead wire with a ferrule surrounding the intermediate lead wire for a portion of its length, comprising first forming, molding and curing a silicone rubber joint surrounding and bonding to the silicone rubber of the heater wire and intermediate lead wire and a part of the ferrule and thereafter forming and molding a rubber joint surrounding and bonding to the rubber insulation of the lead wire and the ferrule.

References Cited in the file of this patent

UNITED STATES PATENTS

| | | |
|---|---|---|
| 2,287,163 | Bishop | June 23, 1942 |
| 2,393,935 | Scott | Jan. 29, 1946 |
| 2,635,975 | Peters | Apr. 21, 1953 |

FOREIGN PATENTS

| | | |
|---|---|---|
| 587,580 | Great Britain | Apr. 30, 1947 |